United States Patent [19]
Junike et al.

[11] 4,100,671
[45] Jul. 18, 1978

[54] ARRANGEMENT FOR AUTOMATICALLY CHANGING THE CLAMPING JAWS OF THE CHUCK OF A MACHINE TOOL

[75] Inventors: Wilhelm Junike; Klaus Rall, both of Hanover; Wolfgang Schaefer, Langenhagen; Günther Twiefel, Burgwedel, all of Germany

[73] Assignee: Gildemeister AG, Bielefeld, Germany

[21] Appl. No.: 798,605

[22] Filed: May 19, 1977

[51] Int. Cl.² .................... B23Q 3/00; B23Q 3/155
[52] U.S. Cl. .................................................. 29/568
[58] Field of Search ............... 29/568, 26 A; 82/2.5, 82/2.7; 214/1 BD, 1 BB, 1 BC

[56] References Cited
U.S. PATENT DOCUMENTS

| | | | |
|---|---|---|---|
| 3,744,125 | 7/1973 | Schalles | 29/568 |
| 3,779,110 | 12/1973 | Harman et al. | 82/2.5 |

*Primary Examiner*—Gil Weidenfeld
*Attorney, Agent, or Firm*—Wegner, Stellman, McCord, Wiles & Wood

[57] ABSTRACT

A gripping or clamping jaw magazine and a transfer mechanism for transferring sets of jaws of different configuration from the magazine to the chuck and vice versa. The system automatically changes the jaws to accommodate various geometric forms and surfaces of workpieces to be inserted in the chuck for machining.

23 Claims, 4 Drawing Figures

ARRANGEMENT FOR AUTOMATICALLY CHANGING THE CLAMPING JAWS OF THE CHUCK OF A MACHINE TOOL

This invention broadly relates to an arrangement for automatically changing the gripping or clamping jaws of the chuck of a machine tool, and more specifically to a jaw magazine and a transfer mechanism for transferring the jaws from the magazine to the chuck and vice versa.

Chuck jaws are changed in order to adapt the chuck to various geometric forms and surfaces of the workpiece to be machined. In conventional machine tools, the clamping jaws of the chuck are still changed by hand. To this end, the chuck jaws to be changed are successively removed from the chuck, after which the new jaws are then inserted into the chuck.

The increasing degree of automation in machine tools has also resulted in the development of machinery for automatically changing the clamping jaws of a chuck. Thus, German Pat. No. 2,104,904 for example describes an automatic changing unit which works with twopiece clamping jaws. Each clamping jaw consists of a radially displaceable base jaw which remains in the chuck and of a replaceable so-called "false" jaw. On their opposite sides, the base jaws and false jaws comprise undercut grooves and projections which can be brought into engagement with one another for connecting the two jaws. The sets of false jaws required for changing are stored on palettes which are arranged in a row one behind the other in the direction of the chuck axis in a magazine. The magazine is displaceable parallel to the chuck axis. The transfer mechanism consists of a pivotal, double-armed gripper by means of which palettes can be removed from the magazine and conveyed towards the chuck for the changing operation. The disadvantage of this known unit is that it can only be used for changing the two-piece clamping jaws designed specifically for it. This means that the usual one-piece clamping jaws of the type described for example in German Pat. No. 2,007,509, cannot be replaced with a unit such as this. In addition, the known unit is fairly complicated and expensive, in addition to which the concentricity of two-piece clamping jaws is lower than that on one-piece clamping jaws.

The object of the present invention is to provide a simple arrangement for automatically changing the clamping jaws of the chuck of a machine tool, by means of which conventional one-piece clamping jaws can be changed.

According to the invention, this object is achieved in that the clamping jaws are arranged in rectilinear guides in the magazine in such a way that, when the chuck and the magazine are in the changing position relative to one another, the guide for at least one clamping jaw of the chuck aligns with the guide for at least one clamping jaw of the magazine, and in that the transfer mechanism comprises at least one transfer element which is displaceable in the direction of the aligning guides.

In one embodiment of the invention, the magazine is in the form of a ring magazine which is concentric with the chuck and in which the guides for the clamping jaws extend radially of the chuck axis.

The arrangement is best constructed in such a way that a number of guides for the clamping jaws in the ring magazine equal to the number of clamping jaws in the chuck align with the guides for the clamping jaws in the chuck. In this case, it would be possible for the transfer mechanism to comprise only one transfer element which is successively guided to the places where guides of the chuck align with guides of the ring magazine in order to effect the displacement at those places. However, it is preferred that the transfer mechanism comprise a number of transfer elements equal to the number of clamping jaws in the chuck, each of these transfer elements being associated with one pair of aligning guides. If the chuck comprises three clamping jaws for example, the chuck and the ring magazine must be postionable relative to one another in such a way that the three guides of the chuck align simultaneously with three guides of the ring magazine. With three transfer elements, all three clamping jaws could thus be changed at the same time.

It is possible for the ring magazine to be fixed. In this case, the chuck would have to be turned into the changing position in order to effect the change in operation. In addition, the transfer mechanism would have to be displaceable so that the transfer element or the transfer elements would also be brought into a position in which they could displace the clamping jaws in the manner necessary for transfer. However, it is simpler for the ring magazine to be pivotal about the axis of the chuck and to be able to be locked in certain angular positions in which it aligns with a starting position of the chuck. In this case, the transfer mechanism may also be fixed. The transfer element or the transfer elements may then also be aligned with the starting position of the chuck.

In another embodiment of the invention, the magazine may be in the form of a drum magazine or chain magazine which is rotatable about an axis extending perpendicularly of the chuck axis and which is provided at its periphery with guides for clamping jaws which extend parallel to that axis.

However, it is also possible to use the drum magazine or chain magazine in addition to the ring magazine concentrically surrounding the chuck. In this case, the arrangement has to be such that a guide of the drum or chain magazine can be brought into alignment with a guide of the ring magazine and an additional transfer mechanism is provided for transferring clamping jaws between the two magazines, comprising a transfer element displaceable in the direction of the aligning guides of the two magazines.

Furthermore, the drum or chain magazine may be arranged in such a way that, when the chuck and the ring magazine are in the changing position relative to one another, a guide of the drum or chain magazine can be brought into alignment with an aligning pair of guides of the ring magazine and the chuck. If the displacement path selected for the transfer element of the additional transfer mechanism is correspondingly long, a clamping jaw can be directly transferred from the drum or chain magazine to the chuck and vice versa by means of this transfer element.

Another possibility of increasing the storage capacity of the chucks to be replaced is to provide in the ring magazine at least two rows of circularly arranged guides for clamping jaws disposed one behind the other in the axial direction of the chuck, and to mount the ring magazine for axial displacement. In this case, the particular row of clamping jaws selected can be brought into the changing position by axial displacement. In order to bring the rotatable ring magazine into the changing position relative to a starting position of the chuck, the ring magazine may be provided with a rotary drive. In order to avoid the need to provide an additional drive for the axial displacement of the ring magazine for selecting the corresponding row of clamping jaws, it is possible according to another embodiment of the invention to provide the ring magazine with a converter which, when the ring magazine is locked in position, converts the rotational energy transmitted from the rotary drive to the ring magazine into a displacement of the ring magazine. To this end, the ring magazine may consist of an axially stationary part and an axially displaceable part containing at least the guides for the clamping jaws, the rotary drive acting on the axially stationary part and the converter being arranged between the axially stationary part and the axially displaceable part.

In one embodiment of the transfer mechanism, the transfer element may be formed by a rod whih is displaceable in the direction of alignment of the guides and which comprises coupling means at its end facing the clamping jaw to be displaced, and corresponding co-operating coupling means are provided on the peripheral side of each clamping jaw. The coupling means on the rod may be formed for example by an undercut key-head whilst the co-operating coupling means may be formed by an undercut keyhole, the rod being rotatable through a limited angle about its longitudinal axis so that the undercuts of the keyhole and key-head engage behind one another when the keyhead is introduced into the keyhole. In addition, part of the rod may be provided with a screwthread and another part with a non-circular profile, an axially non-displaceable nut adapted to be driven by a first drive being arranged on the screwthread. That part of the rod which is provided with the non-circular profile may be disposed in a guide sleeve which is provided with a corresponding non-circular hollow profile and which is adapted to be rotated through the limited angle by a second drive.

It is best to use a number of rods equal to the number of clamping jaws in the chuck, the rods being distributed over the circumference of the ring magazine according to the changing positions. Each of the nuts arranged on the rods may externally assume the form of a gearwheel, in which case all the gearwheel nuts may mesh with a first rotatable gear ring which is mounted concentrically of the chuck axis and which is connected to the first drive. In this case, therefore, all the gearwheel nuts are rotated by a single drive through the first gear ring in such a way that the rod moves forwards or backwards with its thread in the gearwheel nut.

For adapting the chuck to different workpieces, it is often sufficient to vary the clamping diameter by staggering the clamping jaws in the chuck. To this end, it is best to subordinate the drive of the gear ring to the control of the machine by which paths of different length can be predetermined for the rods. In this case, the coupling, positioning and locking operation fully corresponds to that carried out during changing of the clamping jaws.

Similarly, it is possible in cases where several rods are used to lock the keyhead and the keyhole by means of a single drive. This result is obtained by providing each guide sleeve on the rod with an external tooth system, in which case all the guide sleeves are directly or indirectly connected by their external tooth system to a rotatable ring arranged concentrically of the chuck axis and the ring is connected to the second drive. When the second drive rotates the ring, the rotational movement is simultaneously transmitted to the guide sleeve which then rotates through the limited angle referred to above.

In cases where clamping jaws provided on their backs with a number of toothed grooves, as is the case with the clamping jaws described in German Pat. No. 2,007,509, are used, the clamping jaws may be held in position in the magazine by spring-mounted detents which engage in the toothed grooves.

To prevent chips from flying into and soiling the ring magazine during the machining of the workpiece in the chuck, a cylindrical screening wall may be arranged between the ring magazine and the chuck, extending concentrically of the chuck axis. This screening wall must be provided with openings at least at those places where the clamping jaws are to be pushed through for replacement between the chuck and the magazine. If the ring magazine is rotatable, the screening wall may be fixedly arranged on the machine, in which case the openings must be aligned with the starting position of the chuck.

One embodiment of the above-described concept of converting the rotational energy transmitted by the rotational drive to the ring magazine into an axial displacement when the ring magazine is locked in the direction of rotation, a second gear ring with which at least one gearwheel engages is mounted for rotation concentrically of the chuck axis on the axially stationary part of the ring magazine. Each gearwheel may be fixedly, i.e. non-rotatably, connected to a threaded spindle which is mounted for rotation on the axially stationary part of the ring magazine, each threaded spindle engaging in a corresponding threaded bore in the axial displaceable part of the ring magazine. In this case, the second gear ring may be connected to the rotary drive, the axially stationary part of the ring magazine being adapted to be locked by an indexing mechanism in certain angular positions corresponding to the chaning positions. In this practical embodiment of the above-described concept, therefore, the converter consists of the threaded spindle belonging to the axially stationary part of the ring magazine and of the threaded bore belonging to the axially displaceable part of the ring magazine. The indexing mechanism may be formed for example by a forwardly and backwardly displaceable indexing pin and by corresponding, peripherally distributed indexing holes in the axially stationary part of the ring magazine.

The preferred embodiment of the invention is described in the following with reference to the accompanying drawings, wherein.

Figure 1:
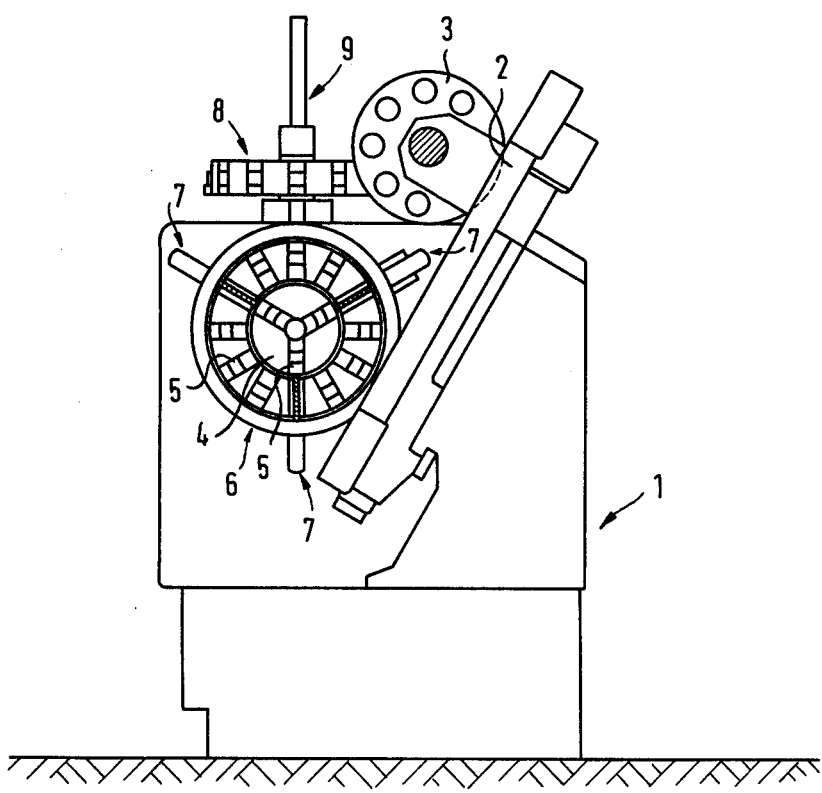
FIg. 1 shows a lathe with a ring magazine and a drum magazine.
Figure 2:
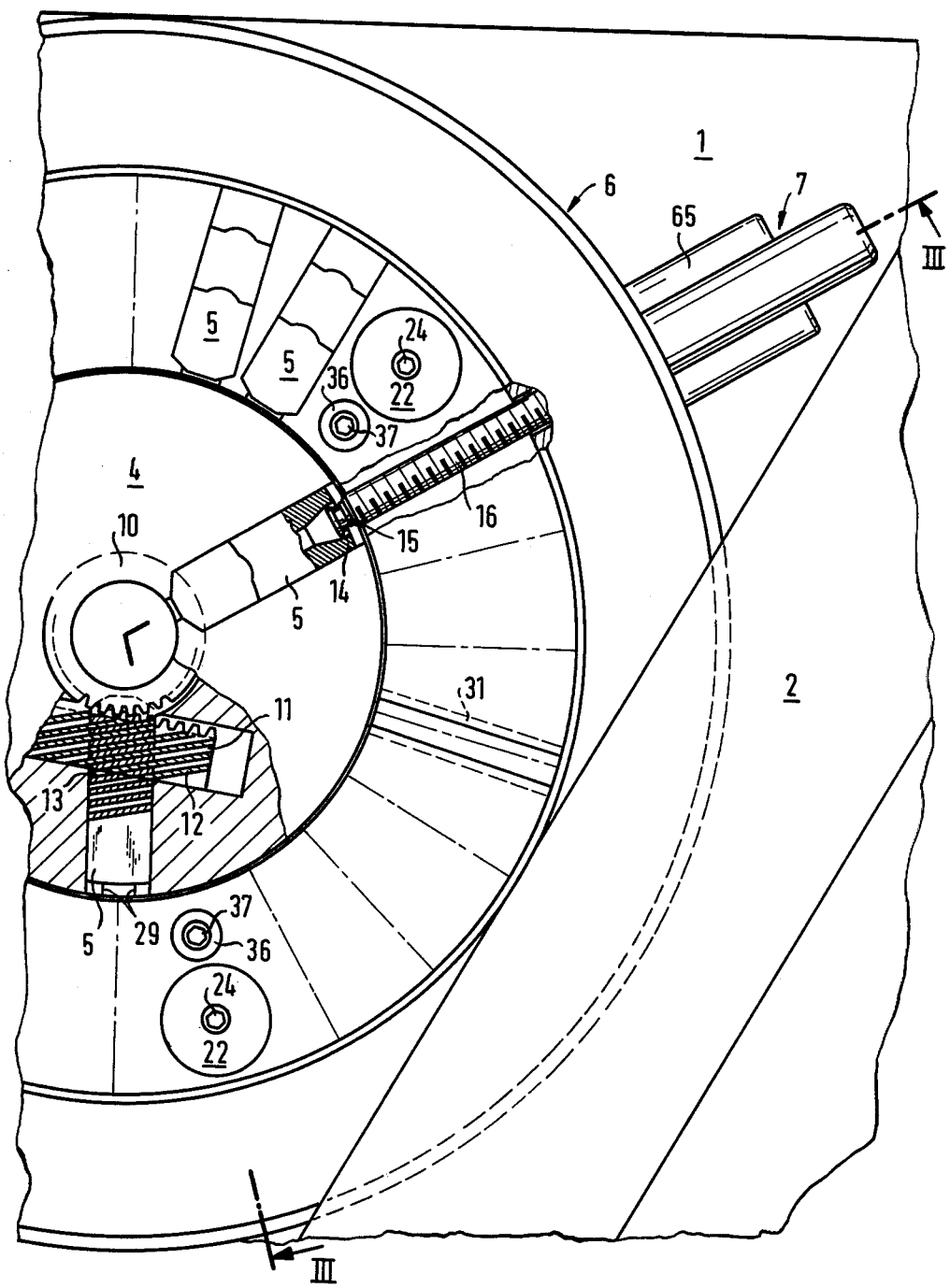
FIG. 2 is a view on an enlarged scale of the chuck and the ring magazine of the lathe illustrated in FIG. 1.

The lathe illustrated in FIG. 1 comprises, on a sloping bed, a cross slide 2 with a tool magazine 3. A ring magazine 6, in which several sets of clamping jaws are accommodated, is arranged around a chuck 4 with three clamping jaws 5. The clamping jaws are changed by a three-part transfer mechanism 7 which will be described in more detail hereinafter. A drum magazine 8 with an additional transfer mechanism 9 is arranged over the ring magazine 6. As shown in FIG. 2, a gearwheel 10 rotatable separately from the chuck 4 is disposed at the centre of the chuck 4, meshing with a rack 11. The rack 11 is provided with oblique, rectilinear projections 12 which engage with correspondingly oblique, rectilinear grooves 13 formed in the back of a one-piece clamping jaw 5. The clamping jaw 5 is displaceable in undercut grooves 29 which form radial guides for the clamping jaw 5. When the gearwheel 10 is rotated relative to the chuck 4, the rack 11 is displaced tangentially of the gearwheel 10, whereby the clamping jaw 5 is displaced radially outwards or inwards. Clamping jaws of this type and the corresponding displacement mechanism are commonly encountered in machine tools and are described in more detail in German Pat. No. 2,007,509.

The ring magazine 6 comprises a plurality of radial guides 31 for clamping jaws 5. In the interests of clarity, only part of the transfer mechamism 7 is shown in FIG. 2. It consists of a rod provided with a screwthread 16 at the end of which an undercut keyhead 15 is arranged. An undercut keyhole 14 is formed in the outside of each clamping jaw 5. The cross-section of the keyhole 14 is adapted to the cross-sectional profile of the keyhead 15 so that the keyhead 15 can penetrate into the keyhole. After the rod 16 has been rotated through 90°, the keyhead 15 and the keyhole 14 engage behind one another so that the rod 16 can radially displace the clamping jaw 5 for replacement.

Figure 3:
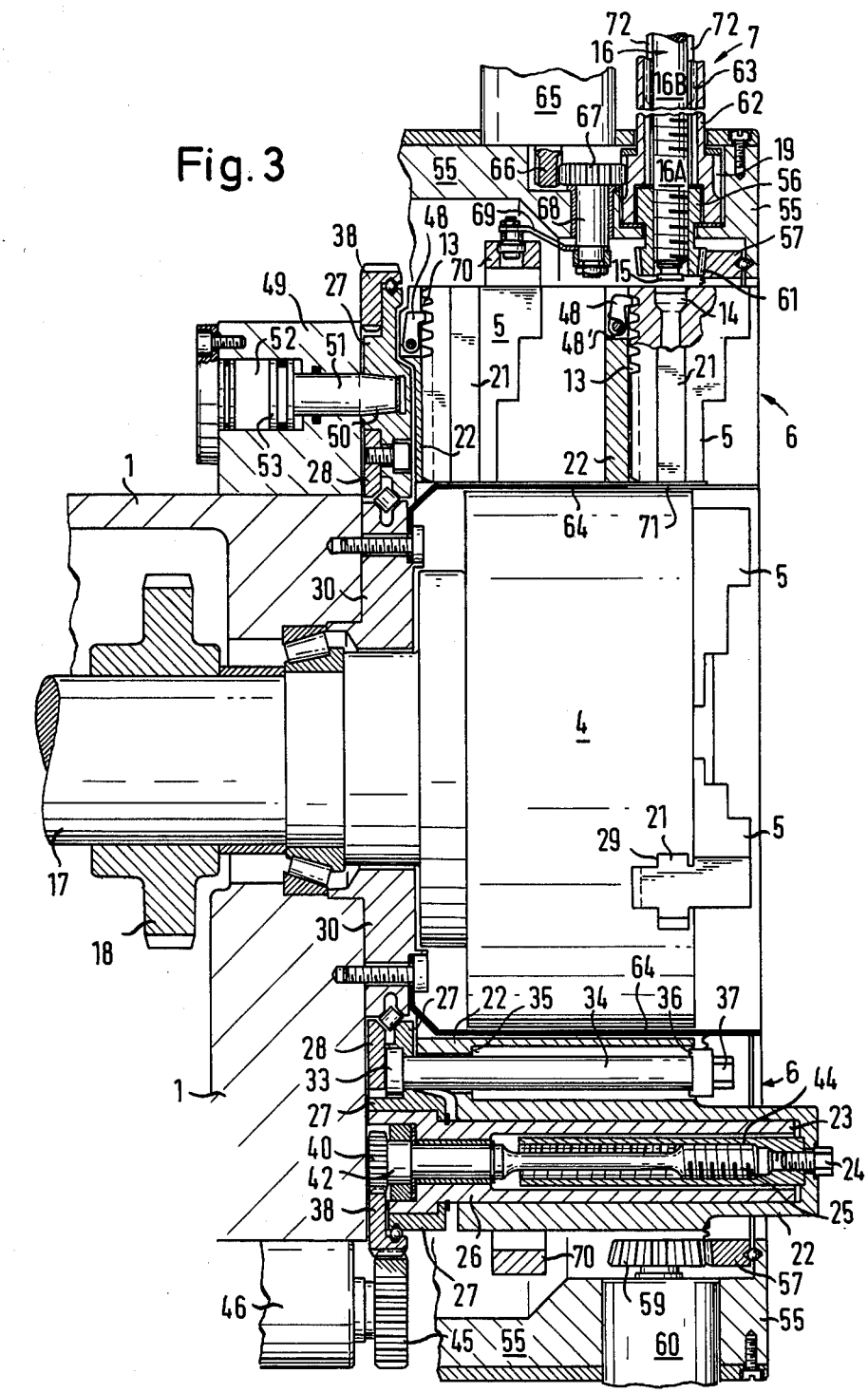
FIG. 3 is a secton through the chuck and the ring magazine on the line III—III in FIG. 2.

As shown in FIG. 3, a shaft 17 carrying the chuck 4 is mounted in a bearing of the housing of the machine 1. A gearwheel 18 is mounted on the shaft 17, being connected to a drive (not shown) for the chuck 4. The clamping jaws 5 anchored in the chuck 4 are provoded with a T-profile which is guided in an undercut T-profile 29.

Tow rows of guides 29 for clamping jaws 5 are provided in the ring magazine 6. The guides are not visible. However, two clamping jaws 5 with their undercut T-profiles 21 are shown in the upper part of the ring magazine 6. The two clamping jaws 5 are held in the ring magazine by detents 48 which engage in the toothed grooves 13 formed in the back of the clamping jaws. The detents 58 are pressed against the clamping jaws 5 by springs 42'.

The ring magazine 6 as a whole is rotatable about the axis of the chuck 4. It consists of an axially stationary part and of an axially displaceable part. The axially stationary part is mounted in a roller bearing on a flange 30 fixed to the machine. It consists of a shaped part 27 and of a ring 28 which are screwed to one another. A sleeve 26 is disposed in the shaped part 27. In addition, a gear ring 38 comprising an external tooth system and an internal tooth system is mounted in a ballbearing on the shaped part 27. The external tooth system meshes with a gearwheel 45 which is disposed on the drive shaft of a motor 46 fixed to the machine which forms the rotary drive for the ring magazine 6. The internal tooth system of the gear ring 38 meshes with a gearwheel 40 which is fixedly mounted on a spindle 42. The spindle 42 is mounted for rotation in the sleeve 26 but cannot be axially displaced therein.

The spindles 42 is provided with a screwthread 25 which engages with the internal screwthread 44 of a threaded sleeve 23. The threaded sleeve 23 is screwed to another shaped part 22 by means of a screw 24. When the spindles 42 rotates, the threaded sleeve 23 and the other shaped part 22 are axially displaced. Accordingly, the threaded sleeve 23 and the shaped part 22 form the axially displaceable part of the ring magazine 6. The guides for the clamping jaws 5 are disposed in this axially displaceable part.

A thickened shoulder 33 of a stop pin 34 is clamped between the ring 28 and the shaped part 27. At its end, the stop pin 34 comprises a stop head 36 fixed to a screw 37. The stop head 36 corresponds with a stop surface 35 at the bottom of a recess with the shaped part 22.

The ring magazine 6 can be locked in certain angular positions by an indexing mechanism. This indexing mechanism consists of a block 49 fixed to the machine in which an indexing pin 51 is mounted for axial displacement. The indexing pin 51 is connected to a piston 53 mounted in a cylinder chamber 52. The piston-and-cyliner assembly of the indexing mechanism may be hydraulically or pneumatically operated. The feed lines for the pneumatic or hydraulic working medium have been left out in the interests of clarity. The shaped part 29 is provided with a number of recesses 50 corresponding to the number of clamping jaw sets in which the indexing pin 51 can engage and lock the ring magazine 6.

The illustrated part of the transfer mechanism 7 consists of a rod 16 which at its lower end is provided with a threaded part 16A and, at its upper end, with a threadless part 16 B. The threaded part 16A is guided in a nut 56 which is externally provided with teeth 61. The nut 56 is rotatable but not axially displaceable. The external teeth 61 of the nut 56 mesh with a gear ring 57 which is mounted in a ballbearing on a ring element 55 fixed to the machine. In addition, the gear ring 57 meshes with a gearwheel 59 which is mounted on the drive shaft of a motor 60. The motor 60 is fixed to the machine. When the motor 60 rotates, the nut 56 is rotated by way of the gear ring 57, whereby the rod 16 is moved up or down.

The upper part 16B of the rod is threadless. However, it is provided with two ribs 72 which are mounted for axial displacement in corresponding grooves 63 of a guide sleeve 62. The guide sleeve 62 is in turn rotatably mounted in the ring element 55 fixed to the machine, but cannot be axially displaced therein. The guide sleeve 62 is provided with an external tooth system 19 which meshes with a gearwheel 67 which, in addition, engages with a drive pin 66 of a motor 65 fixed to the machine. Accordingly, the guide sleeve 62 and hence the rod 16 as well can be rotated by the motor 65. The gearwheel 67 is mounted on a journal 68 which is connected through a pivotal lever 69 to a ring 70. The guide sleeves 62 for the two other rods 16 are similarly connected to the ring 70 at two other points (not shown). The pivotal levers 69 only pivot through a limited angle because the ring 70 abuts against stops (not shown) in both pivoting directions. This limited pivoting angle defines on the one hand the position in which the keyhead 15 can be introduced into the keyhole 14 and, on the other hand, the position in which the keyhole and the keyhead are locked with one another.

Between the chuck 4 and the ring magazine 6, there is a cylindrical screening wall 64 which is screwed onto the flange 30 fixed to the machine. The screening wall 64 is provided with openings 71 at the three places where the clamping jaws are to be changed. Only one of these openings is shown in FIG. 3.

The changing unit operates as follows:

First of all, the chuck 4 is fixed in a defining starting position. In this starting position, the guides 29 for the three clamping jaws align with the opening 71 in the screening wall 64. The motor 46 is then switched on. Since the index pin 51 is first withdrawn, both the axially stationary part 27, 28 and also the axially displaceable part 22, 23 are rotated. There is no axial displacement of the axially displaceable part. When the guides 31 of three positions in the ring magazine 6 which are not occupied by clamping jaws 5 align with the guides 29 of the chuck 4, an opening 50 is situated in front of the indexing pin 51. The indexing pin 51 is then pushed forwards into the opening 50 and locks the ring magazine 6 against rotation. At the same time, the motor 46 is switched off. The motor 60 is then switched on, whereby the three rods 16 are advanced.

The clamping jaws 5 of the chuck 4 were moved beforehand into the radially outermost position in which there is no longer any engagement between the ribs 12 of the rack 11 and the grooves 13 in the clamping jaws 5 (see FIG. 2). After the keyheads 15 have been introduced into the keyholes 14, the motor 60 is switched off. The motor 65 is then switched on, whereby the rods 16 are rotated through the limited angle. The keyheads 15 are thus locked in the keyholes 14.

The motor 60 is then switched on again, but in the opposite direction, so that the three rods 16 with the clamping jaws 5 coupled thereto are withdrawn into the empty positions of the ring magazine 6.

It will now be assumed that one set of clamping jaws is to be introduced into the chuck 4 from the back row of the ring magazine 6. After the indexing pin 51 has been withdrawn, the motor 46 is switched back on again. When the three clamping jaws to be changed have been rotated through such an angle that their guides are parallel to the empty guides 29 of the chuck, the indexing pin 51 is again pushed forwards into the corresponding opening 50. In this way, the ring magazine 6 is locked in this angular position. However, the motor 46 is not switched off, but continues to act on the gear ring 38. This gear ring 38 rotates the spindles 42, whereby the axially displaceable part 22, 23 of the ring magazine is displaced to the right. The advancing movement is stopped by the stop surface 35 striking the stop head 36, the reduced-diameter spindles 42 allowing a slight elastic rotation to guarantee contact of all the stops. The three clamping jaws 5 situated in the changing position can now be introduced from the back row into the empty guides 29 of the chuck 4. This takes place in exactly the opposite way to the above-described withdrawal of clamping jaws from the chuck 4.

Figure 4:
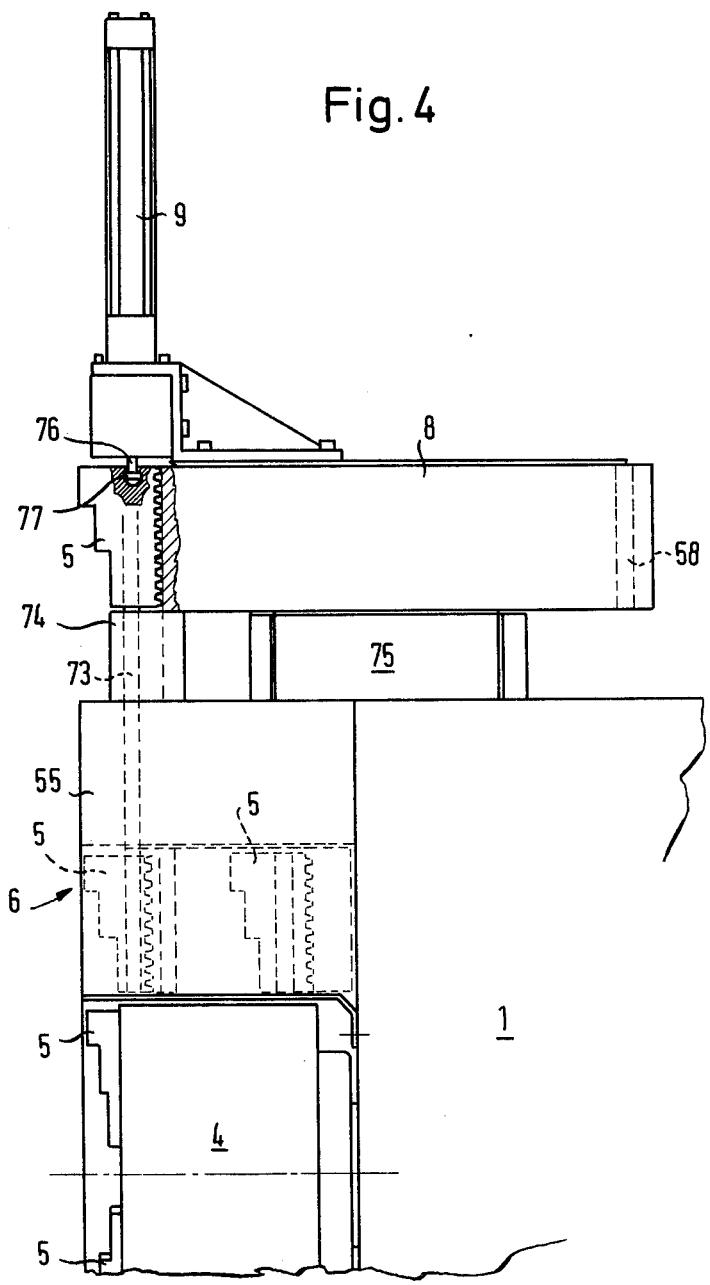
FIG. 4 is a simplified, diagrammatic side elevation of part of the lathe illustrated in FIg. 1 showing the basic arrangement of the chuck, the ring magazine and the drum magazine.

FIG. 4 shows how the drum magazine 8 is arranged in relation to the ring magizine 6. The drum magazine 8 is mounted on a rotary and indexing drive 75 and is provided with guides 58 for the clamping jaws 5. The transfer mechanism arranged on the drum magazine 8 is provided with a displaceable rod 76 which at its end comprises a keyhead 77 corresponding to the keyhead 15 in FIG. 3. As described above, this keyhead can be introduced into and locked in the keyhole of the particular clamping jaw to be changed. In order to bridge the space taken up by the rotary drive 75, an intermediate guide 74 is arranged between the drum magazine 8 and the ring magazine 6. Another guide 73 is provided in that part 55 of the ring magazine 6 which is fixed to the machine. It is important that, in the chaning position, a guide 58 of the drum magazine 8 should align with a guide 31 in the ring magazine 6 and, optionally, also with a guide 29 in the chuck 4 so that a clamping jaw 5 can either be directly introduced from the drum magazine 8 by way of the guides 74, 73, 29 into the chuck 4 or withdrawn therefrom or stored in the ring magazine 6 whence the clamping jaw 5 is introduced into the chuck 4 by means of the mechanism described above. In this case, the drum magazine need only be provided if the capacity of the ring magazine is inadequate. However, it is also possible for the clamping jaws to be changed without the ring magazine, i.e. for the clamping jaws to be directly introduced into and removed from the chuck 4 using the magazine 8 with the guide 74 correspondingly lengthened.

We claim:

1. A device for automatically changing clamping jaws of a rotatable chuck of a machine tool comprising:
   a plurality of clamping jaws for engaging a workpiece;
   a clamping jaw magazine having guide means carrying the clamping jaws;
   a chuck having guide means adapted to receive the clamping jaws;
   means for aligning said guide means adapted to receive the clamping jaws with said guide means carrying said clamping jaws; and
   means for transferring at least one clamping jaw between the magazine and the chuck when said guide means adapted to receive the clamping jaws is aligned with said guide means carrying the clamping jaws.

2. The device of claim 1 wherein the magazine is in the form of a ring which is concentric with the chuck, and said guide means in said magazine extend radially from the axis of the chuck.

3. The device of claim 2 wherein the guide means in said magazine includes a plurality of guides and the guide means in said chuck includes a number of guides equal to said plurality of guides.

4. The device of claim 3 wherein the means for transferring at least one clamping jaw comprises a plurality of individual transfer elements equal in number to the number of guides in the chuck, each individual transfer element associated with one guide in the magazine and one guide in the chuck.

5. The device of claim 2 wherein the magazine in the form of a ring is mounted for rotation about the axis of the chuck and further including means for locking said magazine in selected angular positions.

6. The device of claim 1 wherein the magazine is in the form of a drum mounted for rotation about an axis extending perpendicularly to the axis of the chuck wherein said guide means in said clamping jaw magazine is provided around the periphery of the drum, the guide means in said clamping jaws being parallel to the axis of the drum.

7. The device of claim 6 further including a rotatably mounted ring magazine mounted concentrically with the chuck having guides extending radially from the axis of the chuck for alignment with the guides of said magazine in the form of a drum; and
   a second means for transferring at least one clamping jaw between said magazine in the form of a drum and the rotatably mounted ring magazine.

8. The device of claim 7 wherein said guide means of said magazine in the form of a drum is in alignment with said guide means of said ring magazine when said guide means in said ring magazine is aligned with said guide means in said chuck.

9. The device of claim 8 wherein said means for transferring at least one clamping jaw is displaceable directly between the guide means in said chuck and said guide means in said magazine in the form of a drum.

10. The device of claim 2 wherein said guide means in said magazine in the form of a ring form two circular rows, one behind the other along the axis of the chuck and further including means for axially displacing the magazine in the form of a ring.

11. The device of claim 10 wherein said means for axially displacing the magazine in the form of a ring includes a rotary drive which rotates the ring and axially displaces the magazine when rotational motion of said magazine is restrained.

12. The device of claim 11 wherein said magazine is rotatable and includes an axially stationary portion and an axially displaceable portion, said axially displaceable portion having guide means for said clamping jaws.

13. The device of claim 3 wherein said means for transferring at least one clamping jaw includes rod means displaceable along the axis of the guides in said clamping jaw magazine; and coupling means at an end of said rod adapted to mate with a coupling on said at least one clamping jaw.

14. The device of claim 13 wherein said coupling means includes an undercut keyhead and said coupling on said clamping jaw includes an undercut keyhole wherein said rod means is rotatable through a limited angle about its axis and said undercuts engage behind one another when said keyhead is inserted into said keyhole.

15. The device of claim 14 wherein said rod means is a rod provided with a screw thread on one end thereof, the other end having a noncircular cross section;

an axially nondisplaceable nut mounted on said screw thread and rotatable by a first drive means, said other end receiving a guide sleeve having a corresponding noncircular cross section, the guide sleeve being rotatable through the limited angle by a second drive means.

16. The device of claim 15 wherein said rod means is a plurality of rods, the number of which being equal to the number of clamping jaws in the chuck, each rod provided with a screw thread on one end thereof, each rod having an axially nondisplaceable nut mounted on said screw thread, said nuts being driven by a ring gear concentrically mounted about the axis of the chuck wherein said ring gear is driven by said first drive means.

17. The device of claim 16 wherein a guide sleeve is provided for each rod, each sleeve having external teeth coupled to a rotatable ring disposed concentrically of the chuck axis, wherein the rotatable ring is coupled to the second drive.

18. The device of claim 1 wherein the clamping jaws have a plurality of toothed grooves in a rear portion thereof, said clamping jaws being held in position in said magazine by spring-mounted detents engaging the toothed grooves.

19. The device of claim 3 wherein a cylindrical screening wall is disposed between said ring magazine and said chuck concentrically with the axis of the chuck wherein said screening wall has openings through which the clamping jaws may extend.

20. The device of claim 19 wherein said screening wall is stationary with respect to said ring magazine.

21. The device of claim 12 wherein a concentrically disposed second ring gear is mounted for rotation about the chuck axis on said axially stationary part of said ring magazine;

gear wheel means engaged with said second gear ring, each gear wheel of said gear wheel means fixedly and nonrotatably coupled to a threaded spindle mounted for rotation on said axially stationary part of said ring magazine, each threaded spindle engaged with a corresponding screw thread bore in said axially displaceable part of said ring magazine wherein said second gear ring is connected to said rotary drive and said axially stationary part of said ring magazine is adapted to be locked by an indexing mechanism in certain angular positions corresponding to the changing positions.

22. The device of claim 21 wherein said threaded spindles have a reduced diameter for a portion thereof to provide for slight elastic rotation.

23. The device of claim 21 wherein said indexing mechanism is formed by an outwardly and rearwardly displaceable indexing pin and by peripherally distributed indexed holes in said axially stationary part of said ring magazine.

* * * * *